United States Patent [19]

Pryor

[11] 4,454,935

[45] Jun. 19, 1984

[54] HYDRODYNAMIC BRAKE

[75] Inventor: Dale H. Pryor, Midland, Tex.

[73] Assignee: Oime, Inc., Odessa, Tex.

[21] Appl. No.: 283,273

[22] Filed: Jul. 14, 1981

[51] Int. Cl.³ ................. F16D 57/02; F01D 1/12
[52] U.S. Cl. ..................... 188/296; 188/264 E; 415/52
[58] Field of Search .......... 188/296, 290, 293, 264 E; 415/52, 56, 143, 11, 59; 192/58 A; 60/330, 337, 361, 362, 363, 365, 367

[56] References Cited

U.S. PATENT DOCUMENTS

| | | | |
|---|---|---|---|
| 860,967 | 7/1907 | Dodge | 415/59 |
| 1,137,590 | 4/1915 | Ehrhart | 415/56 |
| 2,425,171 | 8/1947 | Bennett et al. | 188/296 |
| 2,558,976 | 7/1951 | O'Leary | 60/337 |
| 3,860,097 | 1/1975 | Braschler et al. | 60/330 |

Primary Examiner—Bruce H. Stoner, Jr.
Assistant Examiner—Robert J. Oberleitner
Attorney, Agent, or Firm—Marcus L. Bates

[57] ABSTRACT

A hydrodynamic brake apparatus having multiple stage rotor and stator assemblies housed within a main body. A shaft is journaled to the main body and connected to the rotors, so that power input to the shaft is dissipated by the reaction of the hydraulic fluid contained within the main body. An impeller connected to the shaft forces fluid to flow outwardly to the outer marginal end thereof where the fluid is directed across a stator. From the stator the fluid is forced against the turbine which also is affixed to the shaft in spaced relation respective to the impeller. The turbine forces fluid to flow against a housing stator. The fluid returns through the main body to the impeller, or through a cooler and then back into the main body.

12 Claims, 4 Drawing Figures

HYDRODYNAMIC BRAKE

RELATED PRIOR ART

Turnball, et al., U.S. Pat. No. 1,746,372
O. D. North, et al., U.S. Pat. No. 1,915,547
R. G. De La Mater, et al., U.S. Pat. No. 1,985,889
R. G. De La Mater, U.S. Pat. No. 1,992,910
R. G. De La Mater, U.S. Pat. No. 1,992,911
R. G. De La Mater, U.S. Pat. No. 1,992,912
R. G. De La Mater, U.S. Pat. No. 2,061,866
R. G. De La Mater, U.S. Pat. No. 2,113,109
R. G. De La Mater, U.S. Pat. No. 2,126,751
H. W. Ramey, U.S. Pat. No. 2,287,130
R. G. De La Mater, et al., U.S. Pat. No. 2,733,778
R. G. De La Mater, et al., U.S. Pat. No. 2,786,552
J. A. Lyne, U.S. Pat. No. 3,016,991
Braschler, et al., U.S. Pat. No. 3,860,097
Prather, et al., U.S. Pat. No. 3,945,473

BACKGROUND OF THE INVENTION

Torque reaction devices for dissipating energy with a pump-like apparatus are well known to those skilled in the art as evidenced by the above mentioned prior art references. Energy dissipators which avoid frictional metal to metal contact, such as mechanical brakes for example, utilize a circulating noncompressible fluid which is caused to flow between pockets of a stator and rotor thereby providing a torque reaction device which serves as a brake.

In the oil field, where oil wells are drilled far down into the earth, the drawworks of rotary drilling rigs require that energy be rapidly dissipated in order to immediately arrest the fall of pipe going into the wellbore with a rapid, uniform deceleration. There are many other examples where dynamic braking is desired, as for example, a dynamometer associated with a large diesel truck.

Hydrodynamic braking involves the dissipation of power into a noncompressible fluid, as may be achieved by a pump device, and provides a more uniform deceleration of rotating parts. For this reason, it is desirable to employ hydrodynamic braking for decelerating the movement of pipe associated with a drilling rig.

SUMMARY OF THE INVENTION

A multi-stage hydrodynamic brake device comprising spaced stators fixed to the interior of a housing, a shaft journaled within said housing, an impeller and turbine affixed to the shaft in spaced relationship respective to one another and arranged such that the impeller and turbine are spaced apart from one another by one of said stators, while said spaced stators are spaced apart from one another by said turbine.

A fluid inlet and outlet are arranged to cause a noncompressible fluid to be forced to flow from the impeller, across a stator, across the turbine, to the other stator, and then back to the impeller; and, at the same time, to enable the fluid to flow from the last recited stator back to the inlet so that the fluid can be conducted through a heat exchanger; and, moreover, the quantity of fluid contained within the brake housing can be regulated.

In one form of the invention, the impeller is affixed to the shaft by means of an assembly which includes a hub wheel and rim. The pump impeller supports an annular mount and the annular mount supports the turbine. The turbine and the outer marginal end of the impeller are arranged such that each describes a concentric annulus when rotated by the shaft.

One of the stators extends from close proximity to the shaft and terminates at a radial distance from the shaft approximately at the location of the terminal end of the other stator. Accordingly, both stators, turbine, and the marginal end of the impeller are placed in close proximity of one another and lie within concentric annular areas, so that the rotating impeller has a marginal outer end which forms a bucket, the edge of which is placed in close proximity to the edge of a stator bucket, and the other edge of a stator bucket is placed in close proximity to an edge portion of the turbine bucket, and the turbine pocket has an opposite edge portion which is placed in close proximity to a bucket edge portion of the housing stator. The outer marginal end of the housing stator is in the form of a pocket.

In order to controllably dissipate an enormous quantity of energy, the rotating shaft of the instant brake apparatus accelerates fluid along the impeller, with the fluid being forced towards the impeller bucket. The fluid strikes the first stator bucket, thereby providing a reaction and dissipating a tremendous amount of energy. The fluid is then directed from the first stator against the turbine pockets thereby providing a second reaction which also dissipates a tremendous amount of energy. From the turbine pocket, the fluid is directed to the housing stator, and from the housing stator the fluid is forced to the outlet, or back along the housing stator, where the fluid again is forced to flow along the pump impeller.

Accordingly, a primary object of the present invention is to provide an improved method of forcing fluid to flow through a hydrodynamic brake apparatus in a manner to increase the effectiveness of the brake for sustained periods of operation, and to provide control over the brake apparatus.

Another object of the present invention is to provide a multi-stage hydrodynamic brake apparatus wherein fluid flow within the brake assembly occurs across a plurality of rotors, turbines, and stators.

A further object of the present invention is to provide a hydrodynamic brake apparatus having one or more sets of stators, rotors, and turbines; and, wherein each set of rotors includes a pair of spaced pockets, and each set of stators includes a pair of spaced pockets, with the pockets being alternated so that fluid flows across each set of rotors and stators to provide a reaction.

An additional object of the present invention is the provision of a hydrodynamic brake apparatus wherein fluid is pumped by a pump impeller to an impeller pocket, and then to a fixed stator, and then to a turbine pocket, and then to a housing stator pocket.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

DETAILED DESCRIPTION OF THE PREFERRED EMBODIMENT

Figure 1:
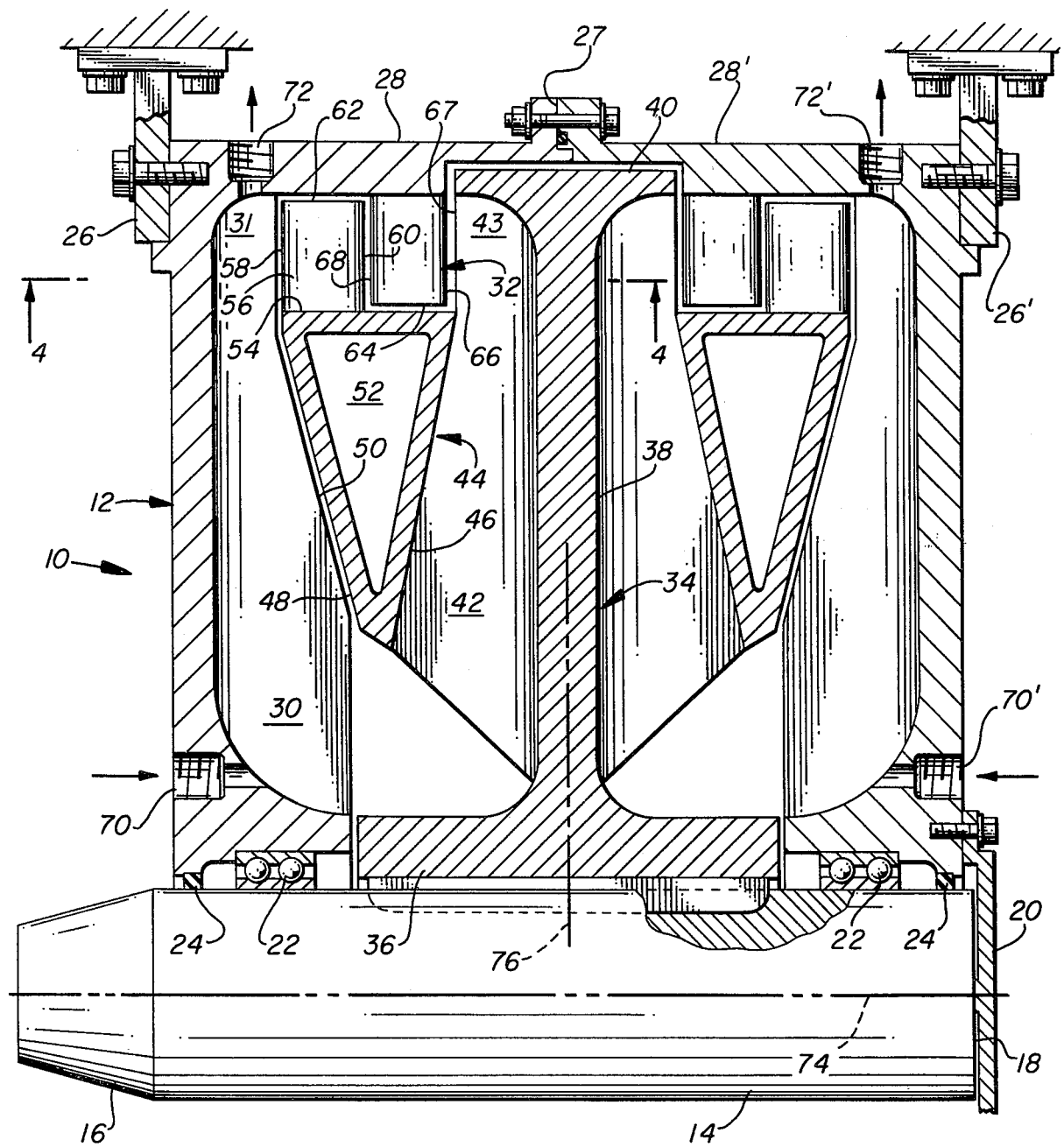
FIG. 1 is a broken, part cross-sectional view of a hydrodynamic brake apparatus made in accordance with the present invention.

In the figures of the drawings, there is disclosed a hydrodynamic brake apparatus 10 made in accordance with the present invention. As seen in FIG. 1, the components of the brake device are housed within a main body 12 having a longitudinally extending axial passageway formed therethrough through which a rotatable shaft 14 is received in journaled relationship therewith. The shaft is provided with a power input end 16, which can take on any number of different forms, as for example, splined, flanged, or keyed marginal end.

The opposed end 18 of the shaft is covered by a closure member 20, although the end 18 could be made similar to the marginal end 16, or alternatively, the shaft could extend at 18 so as to provide additional turbine or pump stages.

Spaced apart main support bearings 22 maintain the shaft rotatably journaled in low frictional relationship respective to the main body. Seals 24 isolate the bearings from ambient. Support members 26 and 26' provide mount means by which the brake device is suitably secured to other structures, as for example, the structure of a drilling rig (not shown).

The main body preferably is split at interface 27, thereby providing a bolt circle by which two housing pieces 28 and 28' can be bolted together. Additional housing pieces can be added to accommodate other stages of the apparatus, if desired.

A stator 30 is in the form of a vane and extends outwardly with the marginal end portion 31 being in the form of a stator pocket. An impeller assembly 34 is comprised of a hub 36, wheel portion 38, and rim portion 40. The hub is attached to the shaft by any convenient means, as for example a keyway.

A pump impeller in the form of a vane 42 is attached to the wheel and the rim. The impeller commences in close proximity of the hub and terminates at the rim. The rim and wheel cooperate together to form circumferentially spaced pockets 43 separated from one another by the radially directed impellers.

An annular mount member 44 is affixed to edge portions 46 of the impeller vanes. The annular mount includes an outer face 48 spaced from a free edge portion 50 of the stator vane 30. The interior of the annular mount preferably is hollow, as indicated by the numeral 52. An outer face 54 of the annular mount has a plurality of circumferentially spaced turbine pockets 56 attached thereto. The turbine pockets include opposed sides 58 and 60, and an outermost terminal edge 62 which is opposed to face 54 of the annular mount.

Stator 32 includes a free edge 64 slightly spaced from the annular mount member face 54. The stator includes opposed forward and inner side edges 66 and 68 which are placed in close proximity to edge 67 of the impeller and inner edge 60 of the turbine pocket.

Impeller pocket 43, intermediate stator pocket 32, turbine pocket 56, and housing stator pocket 31 are more or less concentrically arranged and extend about a common axial centerline, such as the shaft centerline.

Fluid inlets 70 and 70' are formed in the housing in close proximity to the innermost portion of the housing stator, while fluid outlets 72 and 72' are formed at the outer extremity of the housing stator.

The shaft centerline 74 extends through the before mentioned axial passageway, and normal to a plane of symmetric 76 which extends through the impeller assembly. The pump impeller, stator, turbine, and housing stator which lie to the right of plane 76 are identical to the corresponding elements which lie to the left of the plane of symmetry. Moreover, a number of additional stages of the brake assembly can be connected together and to an appropriately longer shaft 16 to provide additional braking power.

Figure 2:
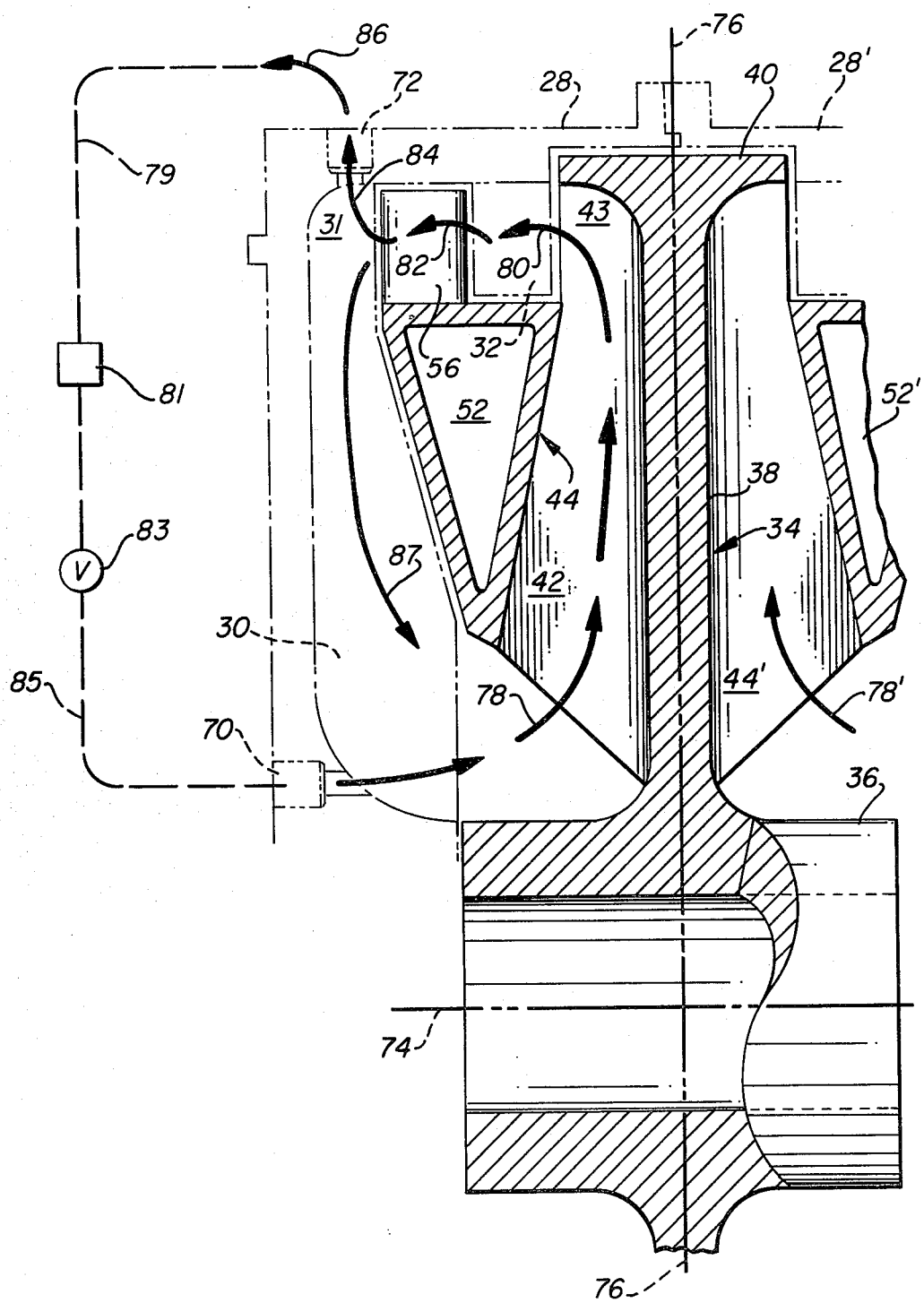
FIG. 2 is a part cross-sectional detail of part of the apparatus disclosed in FIG. 1.
Figure 4:
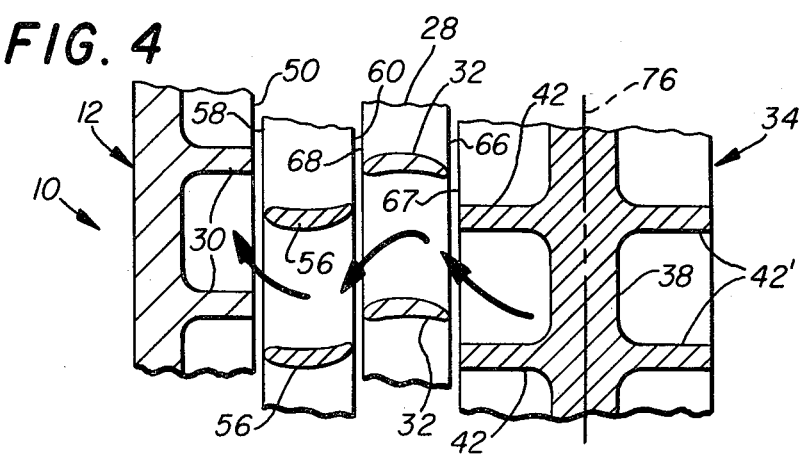

In FIG. 2, the arrows indicated by numeral 78-86 indicate the flow of fluid within the hydrodynamic brake apparatus. Fluid at 78 is forced by impeller 42 to flow through the pocket 43 whereupon the fluid is directed as indicated by arrow 80 into the stator pocket 32. As seen in FIG. 4, the stator pockets deflect the fluid against the concave surface of the turbine pocket 56 whereupon rotational motion of the shaft is further resisted. The fluid is directed against the housing stator, whereupon the fluid then can flow along a flow path 79 to heat exchanger 81, control valve 83, conduit 85, and along the flow path at 78 to the impeller. Other fluid at 87 flows directly back to the flow path 78.

Figure 3:
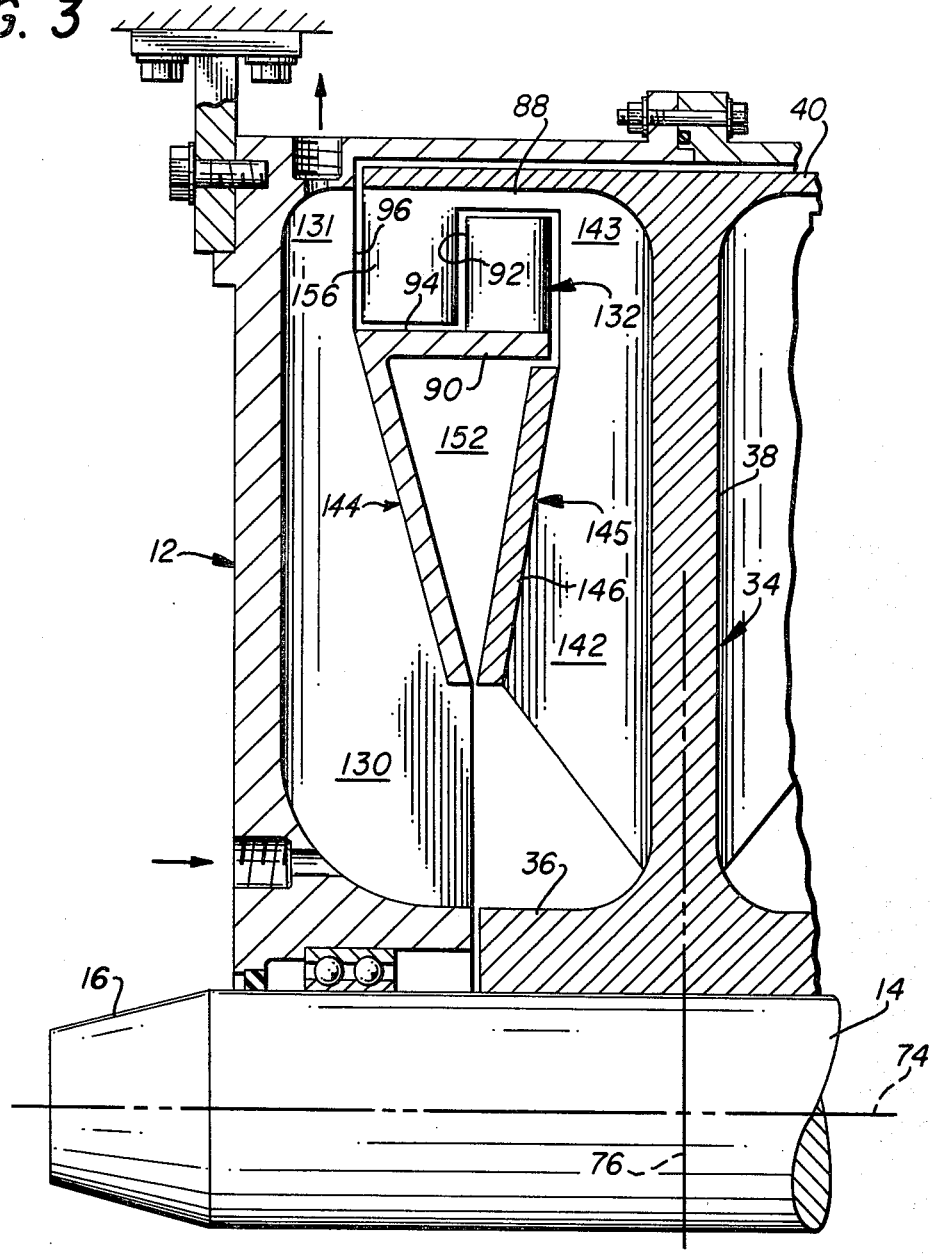
FIG. 3 is a fragmentary, part cross-sectional detail of a modification of the apparatus disclosed in FIG. 1; and, FIG. 4 is an enlarged, fragmented, part cross-sectional view taken along line 4—4 of FIG. 1.

In FIG. 3, bridge 88 connects the pocket of vane 142 to the turbine pocket 156. Bridge 90 connects the stator pocket 132 to the housing stator 130. Member 144 circumferentially extends 360° about the interior of the housing and has the forward end thereof attached to the innermost end of the housing stator vane 130.

Numerals 92, 94, and 96 indicate edge portions of the two stators and the stator bridge within which the turbine pocket can be received in close tolerance relationship therewith. Rotation of the power input shaft imparts rotational motion into the impeller assembly of FIG. 3, with fluid flow through the brake assembly assuming the before described flow path.

The hydrodynamic brake device made in accordance with the present invention includes a circumferentially extending housing with end walls defining the length of the housing, with there being a housing stator 130 on the end wall, the outer marginal end of which is in the form of a pocket 131, and with there being a second stator 132 spaced from the first recited stator 131 and located in proximity to the interior of the circumferentially extending wall. A longitudinally extending shaft 14 is received along the axial centerline 74 of the housing and has a pump impeller 142 attached thereto, with the outer marginal end of the pump impeller being in the form of a pocket 143. A turbine pocket 156 is spaced from the impeller pocket 143, with the turbine pocket 156 being attached to the pump impeller and positioned between the two stator pockets.

The impeller pocket and turbine pocket, along with the two spaced stator pockets, provide a double reaction or multi-stage hydrodynamic brake apparatus. The pump impeller preferably is supported by a wheel 34 having a hub 36 attached to the shaft 14 and an outer rim 40 which forms the circumferentially spaced apart impeller pockets 143. A plane 76 passing through the wheel and hub perpendicularly to the shaft axial centerline divides the brake device into two units, with each of the units being substantially identical to one another so that identical housing halves 28 and 28' can be mated together to provide two spaced multi-stage brake devices.

As seen in FIG. 3, for example, the portion of the brake apparatus to the right of the plane identified by the numeral 76 is identical to the apparatus lying to the other side of the plane.

I claim:

1. A two stage hydrodynamic brake apparatus comprising a housing, spaced stators fixed within the interior of said housing, a shaft journaled for rotation within said housing, an impeller assembly;

said impeller assembly includes a wheel attached to said shaft, said wheel terminates in a rim, said wheel and rim form opposed annular cavities on either side of the wheel; said impeller assembly includes a plurality of vanes which are affixed to said rim and wheel on opposed sides of said wheel; said vanes divide each said annular cavity into circumferentially spaced impeller pockets;

and further including other spaced stators affixed to the interior of the housing in spaced relationship to the first recited stators; said impeller assembly includes turbine pockets supported by said wheel; said turbine pockets are positioned on opposed sides of said wheel in spaced relationship respective to said vanes;

a fluid inlet and a fluid outlet by which fluid can flow to and from said housing;

each turbine pocket and the outer marginal end of each vane being placed in closed proximity to one of the stators and spaced from one another by said stators; said stators being placed in close proximity of said turbine pocket and spaced from one another by said turbine pocket.

2. The apparatus of claim 1 wherein an annular fluid flow passageway extends from said inlet to each said impeller assembly and along each vane of said impeller assembly to the outer marginal end thereof where fluid is forced to flow across one of said stators and thence to the turbine pockets and then to the other of said stators, and then to said outlet.

3. The device of claim 1 wherein said turbine pockets are affixed in spaced relationship respective to the outer marginal end of said vane;

one said stator is affixed in spaced relationship to the other stator.

4. A two stage hydrodynamic brake apparatus comprising a housing, spaced stators affixed respective to the interior of said housing, means by which a shaft is journaled for rotation within said housing, an impeller assembly affixed to said shaft, said impeller assembly includes a vane and a turbine supported by said shaft in spaced relationship respective to one another; a fluid inlet and a fluid outlet by which fluid can flow to and from the interior of said housing;

said turbine and the outer marginal end of said vane being placed in close proximity to a first of said spaced stators and spaced from one another by said first of said spaced stators; said spaced stators being placed in close proximity of said turbine and spaced from one another by said turbine;

said impeller assembly includes a wheel and rim, said wheel being connected to said shaft and said rim being connected to said wheel, said wheel and rim form an annular cavity which is located on one side of the wheel and receives said vane in fixed relation within said annular cavity; said vane and said annular cavity provide circumferentially spaced impeller pockets;

means forming an annular fluid flow passageway which communicate said inlet with said impeller assembly and extends along said vane to the outer marginal end thereof where fluid is forced to flow across said first of said spaced stators and thence to the turbine and then to the other of said stators, and to said outlet.

5. The apparatus of claim 4 wherein an annular mount means is affixed to said vane, and said turbine is affixed to said annular mount, thereby positioning said turbine in spaced relationship respective to said vane;

one said stator is affixed to the other stator in spaced relationship thereto.

6. A hydrodynamic brake device having a main housing; a fluid inlet and a fluid outlet formed in said housing; an axial passageway formed through said housing, journal means, a shaft received along said axial passageway and rotatably mounted by said journal means to said housing;

a pump impeller assembly attached to and circumferentially extending about said shaft, a first stator affixed to said housing and placed in close proximity to an outer marginal end of said impeller assembly for receiving fluid from said impeller assembly;

a second stator affixed to said housing in spaced relationship to said first stator; a turbine, means supporting said turbine in spaced relationship respective to said impeller vane, with said first stator being placed between said impeller vane and turbine, and said turbine being placed between said first and second stator;

a wheel attached to said shaft which terminates in a rim, said wheel and rim form opposed annular cavities on either side of the wheel; said impeller vanes divide the annular cavity into circumferentially spaced pockets; another impeller is affixed to said rim and wheel for providing circumferentially spaced impeller pockets which are opposed to the first recited impeller pockets;

and another stator affixed to the interior of the housing in spaced relation to a housing stator affixed to the opposed end wall of the housing.

7. A hydrodynamic brake device having a main housing; a fluid inlet and a fluid outlet formed in said housing; an axial passageway formed through said housing, journal means, a shaft received along said axial passageway and having a medial length thereof rotatably mounted by said journal means within said housing;

an impeller assembly, including a wheel which terminates in a rim, said wheel and rim jointly cooperate to form an annular cavity on one side of said wheel; a vane received within said annular cavity; said impeller assembly includes a turbine, means supporting said turbine in fixed and spaced relationship respective to said vane; means by which said impeller assembly is attached to and circumferentially extending about said shaft; said vane and said turbine are positioned on the same side of said wheel;

a first stator affixed to the interior of said housing and placed in close proximity to an outer marginal end of said vane for receiving fluid from said vane;

a second stator affixed to the interior of said housing in spaced relationship to said first stator, said first stator is placed between said vane and turbine, and said turbine being placed between said first and second stators.

8. The device of claim 7 wherein an annular mount means is affixed to said vane, said turbine is affixed to said annular mount means in spaced relationship respective to said vane.

9. The device of claim 8 and further including a bridge by which one said stator is affixed in spaced relationship respective to the other stator.

10. The device of claim 7 wherein an annular fluid flow passageway extends from said inlet to said impeller and along said impeller to the outer marginal end thereof where fluid is forced to flow across said first of said stators and thence to the turbine and then to the other of said stators, and then to said outlet.

11. The device of claim 7 and further including an annular mount affixed to said vane in spaced relationship respective to said wheel and rim; said turbine being affixed to said annular mount in spaced relationship respective to said vane whereby said wheel supports said vane which in turn supports said annular mount which in turn supports said turbine.

12. The device of claim 11 wherein one of said stators is relatively large and positioned adjacent to said inlet; and said vane, turbine, and stators are arranged for flow to occur from said inlet, across the large stator, across the vane, across the turbine, across the other stator, and through said outlet.

* * * * *